US011927343B2

(12) United States Patent
Galstian et al.

(10) Patent No.: US 11,927,343 B2
(45) Date of Patent: Mar. 12, 2024

(54) DYNAMIC LIGHTING DEVICE WITH CONTROLLED COLOR TEMPERATURE

(71) Applicant: LENSVECTOR INC., San Jose, CA (US)

(72) Inventors: Tigran Galstian, Québec (CA); Armen Zohrabyan, Québec (CA); Behzad Khodadad, Los Altos, CA (US); Karen Asatryan, Québec (CA)

(*) Notice: Subject to any disclaimer, the term of this patent is extended or adjusted under 35 U.S.C. 154(b) by 0 days.

(21) Appl. No.: 17/764,242

(22) PCT Filed: Sep. 30, 2020

(86) PCT No.: PCT/CA2020/051303
§ 371 (c)(1),
(2) Date: Mar. 28, 2022

(87) PCT Pub. No.: WO2021/062535
PCT Pub. Date: Apr. 8, 2021

(65) Prior Publication Data
US 2022/0349554 A1 Nov. 3, 2022

Related U.S. Application Data

(60) Provisional application No. 62/907,826, filed on Sep. 30, 2019.

(51) Int. Cl.
F21V 9/40 (2018.01)
F21V 14/00 (2018.01)
(Continued)

(52) U.S. Cl.
CPC .............. *F21V 9/40* (2018.02); *F21V 14/003* (2013.01); *F21V 14/06* (2013.01); *H05B 45/20* (2020.01)

(58) Field of Classification Search
CPC .......... F21V 9/40; F21V 14/003; F21V 14/06; F21V 13/02; F21V 5/04; H05B 45/20;
(Continued)

(56) References Cited

U.S. PATENT DOCUMENTS 5,570,210 A * 10/1996 Yoshida ................ G02F 1/1336
349/86
2006/0055854 A1 3/2006 Yu et al.
(Continued)

FOREIGN PATENT DOCUMENTS

CA 2874616 A1 11/2013
CN 102159880 B 7/2014
(Continued)

OTHER PUBLICATIONS

International application No. PCT/CA2020/051303 International Search Report dated Jan. 25, 2021.
(Continued)

*Primary Examiner* — Bao Q Truong

(57) ABSTRACT

A variable angle beam control device is capable of maintaining the same color temperature of the light source regardless of the changes in the angle of the beam. The controllable light beam device has a light source with primary optics producing a low divergence light beam having an inverted angular distribution of the correlated color temperature (CCT), and a liquid crystal device with an electrically variable refractive index distribution arranged to receive said light beam and to provide a variable angle beam.

20 Claims, 20 Drawing Sheets

(51) Int. Cl.
*F21V 14/06* (2006.01)
*H05B 45/20* (2020.01)
(58) Field of Classification Search
CPC ......... H05B 47/105; G02F 1/13; G02F 1/291; G02F 2203/055; G02F 2203/24; F21Y 2115/10
See application file for complete search history.

(56) References Cited

U.S. PATENT DOCUMENTS

| | | | | |
|---|---|---|---|---|
| 2007/0263139 | A1* | 11/2007 | Hwang | G02B 6/0056 349/96 |
| 2018/0335188 | A1 | 11/2018 | Di Trapani et al. | |
| 2019/0025657 | A1* | 1/2019 | Presniakov | G02F 1/134363 |

FOREIGN PATENT DOCUMENTS

| | | |
|---|---|---|
| CN | 108139590 A | 6/2018 |
| CN | 109716225 A | 5/2019 |
| DE | 2235201 A1 | 2/1974 |
| JP | 2010157418 B | 7/2010 |
| TW | 201235621 A1 | 9/2012 |
| WO | 2007/040796 A2 | 4/2007 |
| WO | 2010/035176 A1 | 4/2010 |
| WO | 2017/041167 A1 | 3/2017 |
| WO | 2017/041467 A1 | 3/2017 |
| WO | 2018/045469 A1 | 3/2018 |
| WO | 2019/159462 A1 | 8/2019 |

OTHER PUBLICATIONS

International application No. PCT/CA2020/051303 Search Strategy dated Jan. 25, 2021.
International application No. PCT/CA2020/051303 Written Opinion of the International Searching Authority dated Jan. 25, 2021.
Corresponding European patent application No. 20873180.2 extended search report dated Oct. 2, 2023.
Yu Jiadong, et a., Diffusion films fabricated by phase separation of polymer blend and their application on color uniformity enhancement of LEDs. 2018 19th International Conference on Electronic Packaging Technology (ICEPT). DOI: 10.1109/ICEPT44397.2018. Aug. 8-11, 2018. pp. 1496-1499. XP033411654.
Anh Nguyen Doan Quoc et al., Color uniformity enhancement for white light LED lamps by quartz particles. 2016 5th International Symposium on Next-Generation Electronics (ISNE). May 4-6, 2016. pp. 1-2. XP032944565.
Chang Yu-Yu et al., Design of Optical Module With High Stability, High Angular Color Uniformity, and Adjustable Light Distribution for Standard Lamps. Journal of Display Technology ( vol. 10, Issue: 3, Mar. 2014). pp. 223-227.
Corresponding Chinese patent application No. 202080083073.5 examination report dated Jan. 24, 2024 (Google translation provided).
Corresponding Taiwan patent application No. 109133497 examination report dated Dec. 21, 2023 (Google translation provided).

* cited by examiner

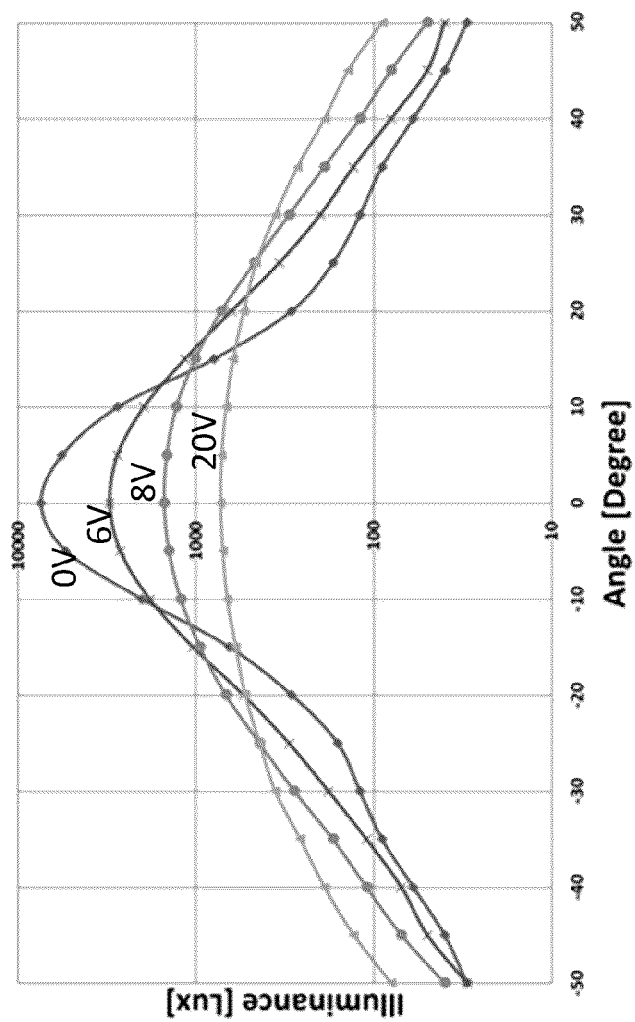

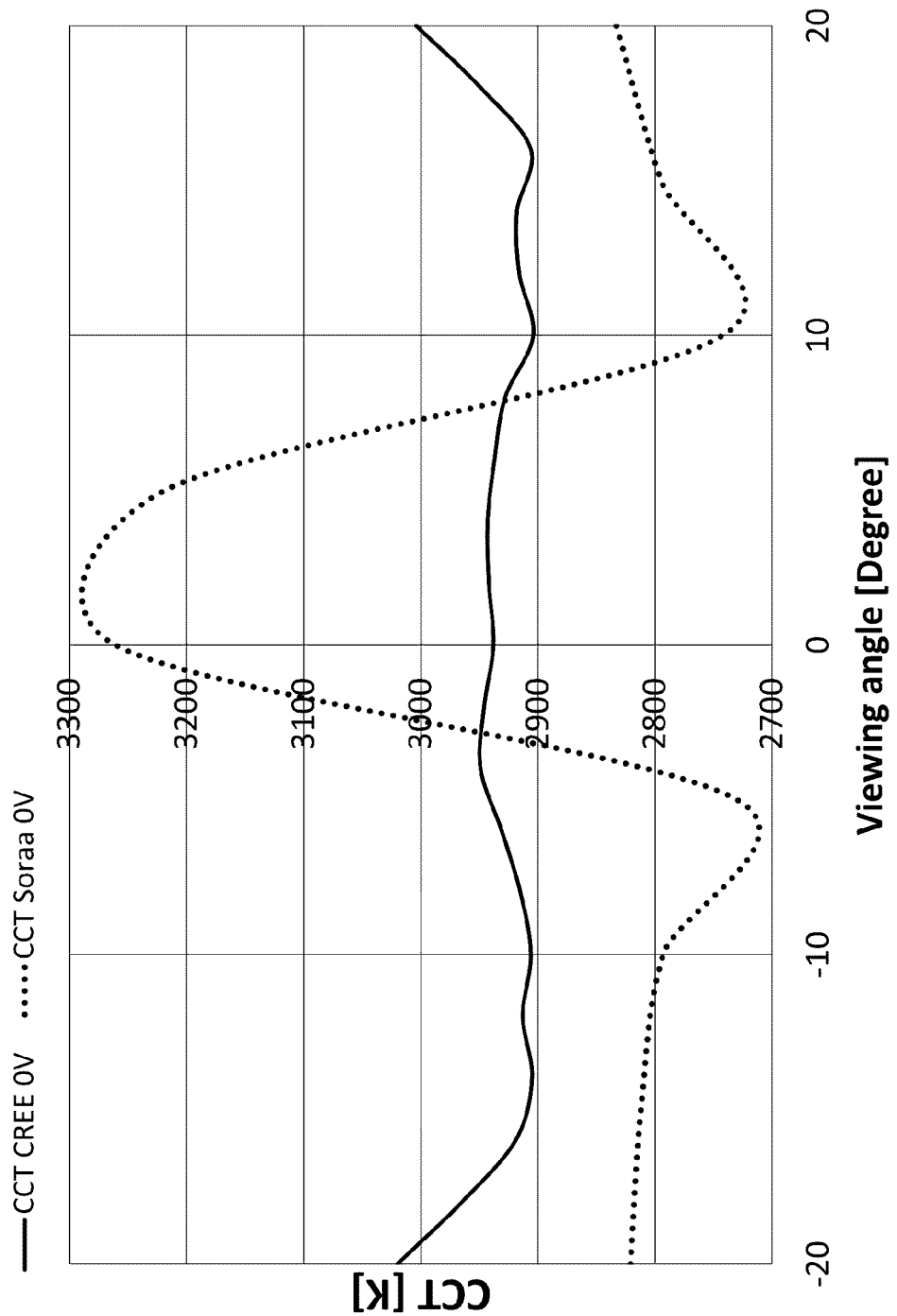

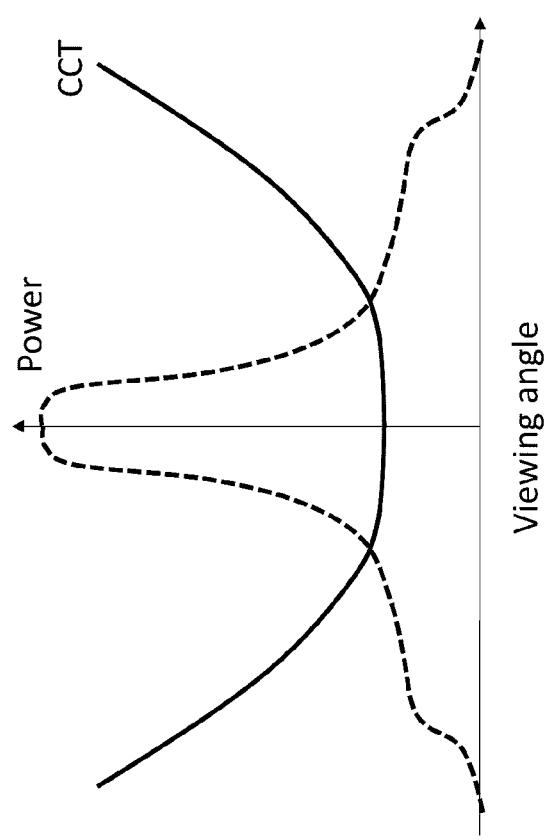

DYNAMIC LIGHTING DEVICE WITH CONTROLLED COLOR TEMPERATURE

This patent application claims priority to U.S. provisional patent application 62/907,826 file Sep. 30, 2019.

TECHNICAL FIELD

The present relates generally to the field of lighting devices and more specifically to the beam shaping devices and methods.

BACKGROUND

Majority of lighting systems currently are stationary, with fixed parameters (such as intensity, color distribution and illumination area or angle). More advanced lighting systems, e.g., those based on light-emitting diodes (LEDs), are offering dynamic modulation of intensity (dimming) as well as color control (defined by the so called "correlated color temperature" or CCT). The dynamic control of the beam's shape is extremely rare since it requires the use of step motors, which are bulky, fragile and expensive.

The PCT application with international publication number WO2017041167A1 discloses liquid crystal (LC) based device that enables the dynamic control of the light beam's shape (LC beam shaper) without involving motors or other mechanical movement. The operation of this device is based on the dynamic generation of micro lens arrays that can focus light very tightly at different positions over the transversal plane of the clear aperture of the light source and result into the broadening of the illumination area in a controllable way.

The above-mentioned LC micro lenses have chromatic aberrations as almost all other lenses made of standard optical materials. These aberrations may be conditioned by the profile of the refractive index as well as by material's dispersion (the dependence of the material's refractive index upon the light wavelength). Usually (in the transparent spectral range) the refractive index of those materials is decreasing with the increase of the wavelength. As a result, lenses made of standard materials, may focus more tightly the short wavelength (blue) light as illustrated in FIG. 1a, which will result into a larger induced divergence of this (blue) light B, compared to long wavelength (red) light R. The dynamic LC beam shaper is working in a similar way when installed in front of a luminary as shown in FIG. 1b.

Thus, for a collimated white light source whose beam is broadened by refractive optics, the blue light will be broadened more than red light, such that the blue light intensity will decrease for low angles and will increase at larger angles relative to the red light intensity as the beam is broadened. This will change the "color over angle" (COA) distribution of light and thus will reduce the CCT in the center of the beam.

Furthermore, many commercially available light luminaires are composed of a light source with a blue LED-pumped phosphor that up-converts the wavelength of light by emitting a white light which is then collimated by a composite optical system, for example, by using total internal reflection "lens", a Fresnel lens, a metallic reflector, etc. (usually called "base lens").

However, in such devices, because of the above-mentioned problem, the broadened light beam loses its CCT in the centre of the beam (the well collimated portion) compared to the periphery of the beam (more diverging portion). This may not be acceptable for such applications where the COA is important, e.g., in museums where the CCT of light will change when trying to adjust the size of the beam to the art work, etc.

Therefore, there exists a need for solution to address such CCT drop when using dynamically controlled liquid crystal beam shapers.

SUMMARY

The present disclosure provides, among others, solution for the above-mentioned problems to provide a variable angle beam capable of maintaining the same color temperature of the light source regardless of the changes in the angle of the beam. In other words, the present disclosure provides a dynamic lighting device with almost constant color temperature. By the expression "same color temperature", it will be appreciated that this is a subjective measure, however, for clarity in this application, the "same color temperature" at it relates to a light beam will be understood as a color variation, for example less than 200K across the beam in case if an overall CCT of original light source that is close to 3000K.

In one broad aspect, the present disclosure provides a beam shaping lens for providing a varied angle beam almost with a constant white light temperature in the specific area (e.g., in the low angular spectrum) of the beam for different states (angles) of overall broadening. The lens includes a beam shaping lens having a variable refractive index (e.g., liquid crystal based), a lens driver, an original beam with specific "fixed" angular distribution of light intensity and CCT from a light module (luminaire). The fixed angular distribution may comprise an inverted correlated color temperature (CCT). For example, an inverted CCT beam may be a beam having a CCT that is lower at a viewing angle of 0 degrees than at a viewing angle of 10 degrees, with a CCT variation (caused by the LC beam shaper) in said light beam between 0 degrees and 10 degrees of viewing angle being less than 200 K in the case of an overall CCT of about 3000K. This is a CCT variation of less than 10%, preferably less than 7% in the viewing angle range between 0 degrees and 10 degrees. For a cold white light beam around 5000K to 6500K, this would mean a CCT variation less than about 600K, preferably less than 450K in the viewing angle range between 0 degrees and 10 degrees. The inverted CCT profile as a function of angle within the beam from the center of the beam can have an inverted bell shape.

In one specific case, the original COA distribution of that original beam has inversed bell-shape (that is, the CCT in the center/"small angles" is lower compared to the CCT at the periphery/"larger angles" of the beam).

In another specific case, an electrically tunable spectral filter (such as cholesteric liquid crystal) is used along with the said beam shaping lens to operate in a correlated way and to increase the transmission of blue light component of light along with the continued broadening the of the beam by the beam shaping lens.

In another specific case, the said light source has an adjustable color temperature capability, and the overall system has an angle adjuster interface for receiving a beam angle signal and sending an angle signal for adjusting the angle of said variable angle beam, a CCT correction unit, receiving said angle signal from and adjusting said light module accordingly, wherein said CCT correction unit adjusts said color temperature level of said light module according to a color-temperature drop corresponding to said angle beam shaping lens.

In some embodiments, the CCT correction unit further receives a CCT signal from a CCT interface/controller and adjust the color temperature level of the light module according to said CCT signal and said angle signal.

In some embodiments, the CCT correction unit further receives a dim adjustment signal from a dim interface and adjust at least one of the angle of said variable angle beam and said color temperature level accordingly.

In one broad aspect, the present disclosure provides a lighting apparatus with a variable angle beam having almost a constant white light temperature at specific angular spectrum (e.g., in the center of the beam) for different broadening states (angles) of the beam. The apparatus includes a light module having an adjustable color temperature, a light module driver configured to adjust electrical signals applied to said light source to adjust said color temperature accordingly, a beam shaping lens (e.g., liquid crystal based) with variable refractive index for different colors having a lens driver configured to receive a fixed angle beam from said light module and to provide a variable angle beam, an angle adjuster interface for receiving a beam angle and sending an angle signal for adjusting the angle of said variable angle beam, a CCT correction unit receiving said angle signal and controlling said light module driver and lens driver wherein said CCT correction unit adjusts said color temperature level of the light emitted by the light module according to a color-temperature drop caused by said beam shaping lens.

In another broad aspect, the present disclosure provides a method for adjusting a variable angle light beam to maintain a relatively constant color temperature in specific angular spectrum of the beam with different broadening states (angles) of that beam. The method comprising setting a specific beam angle for a light module having a plurality of light emitting elements in at least two colors, measuring changes in color temperature of said light module, adjusting current applied to said plurality of light emitting elements to compensate for said changes, corresponding said current with said specific angle for achieving said constant color temperature.

Alternatively, for a known and part-to-part repeatable light sources and beam shaping devices, the CCT adjustment may be done according to a pre-established table without a real time measurement being needed.

While in some embodiments, the light source and primary optics are designed to provide inversed bell-shaped angular distribution of CCT of the originally emitted light, in other embodiments, the light source and primary optics are designed to provide bell-shaped angular distribution of power of the originally emitted light along with slow decreasing (with the increase of angle) tails containing high CCT.

In other embodiments, the liquid crystal device can include a dynamic beam shaping device and an additional electrically tunable spectral filter that can variably control the spectral content of transmitted light. In this case, the device can include a controller and corresponding interface to receive the angle information and to adjust the transmission spectra by providing a corresponding control signal to the tunable spectral filter. The liquid crystal device can have a common driver to control simultaneously the beam shaping lens and the tunable spectral filter.

BRIEF DESCRIPTION OF THE DRAWINGS

The present examples will be better understood with reference to the appended illustrations which are as follows:

FIG. 1.b is a schematic illustration of a dynamic liquid crystal (LC) beam shaper working with a light source.

FIG. 2 is a diagram showing the illuminance of a light source versus the beam angle (for a light source with a blue LED-pumped phosphor) at different Voltages applied to the LC beam shaper (0, 6, 8 and 20V).

FIG. 7 is a diagram showing the CCT value distribution over angle for original beams obtained from commercial Cree (relatively flat) and Soraa (bell-shaped) sources at 0V (applied to the liquid crystal beam shaper).

FIG. 9a is a diagram showing a specific (desired) case of luminaire with light power and CCT distribution over angle. The beam power has traditional bell-shaped form, while the CCT has an inversed bell shape.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the scope of the invention. Thus, it is intended that the present invention covers the modifications and variations of this invention provided they come within the scope of the appended claims and their equivalents. Reference will now be made in detail to the preferred embodiments of the invention.

Liquid crystal beam shaping devices are known in the art. Such devices typically use patterned electrodes arranged at one or both sides of a liquid crystal layer to create a spatial variation in the index of refraction (by electric field induced molecular reorientation) that is useful to control a light beam. Multiple micro lenses (or arrays of micro lenses) can thus be produced and controlled electrically. Their activation may generate strong focusing and defocusing effects resulting into an electrically variable divergence of the light beam.

Figure 1A:
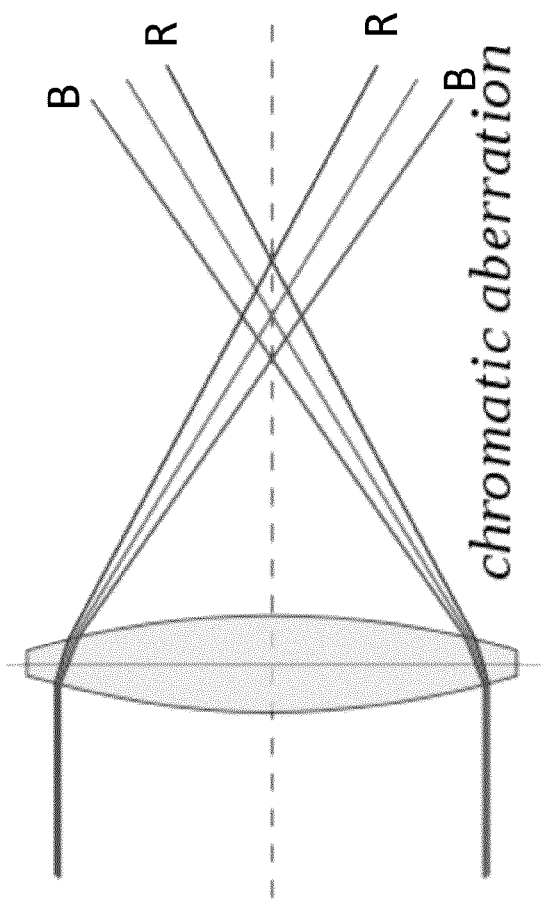
FIG. 1.a is a schematic illustration of using a lens made of standard materials resulting into diverging difference for various wavelengths of light.

As described in FIG. 1a, the LC micro lenses have chromatic aberrations (as the majority of traditional lenses), which may be conditioned by the profile of the refractive index as well as by material's dispersion and, as a result, may focus more tightly the blue light B which will result into a larger induced divergence of short wavelength (blue) light, compared to long wavelength (red) light R.

Figure 1B:
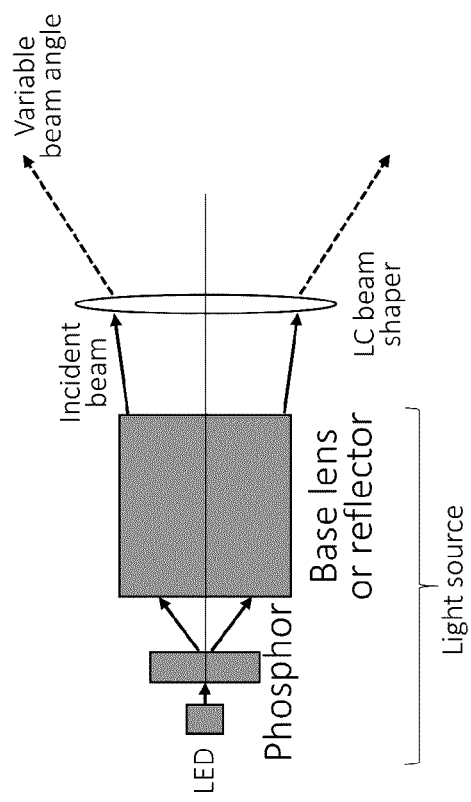
Figure 3:
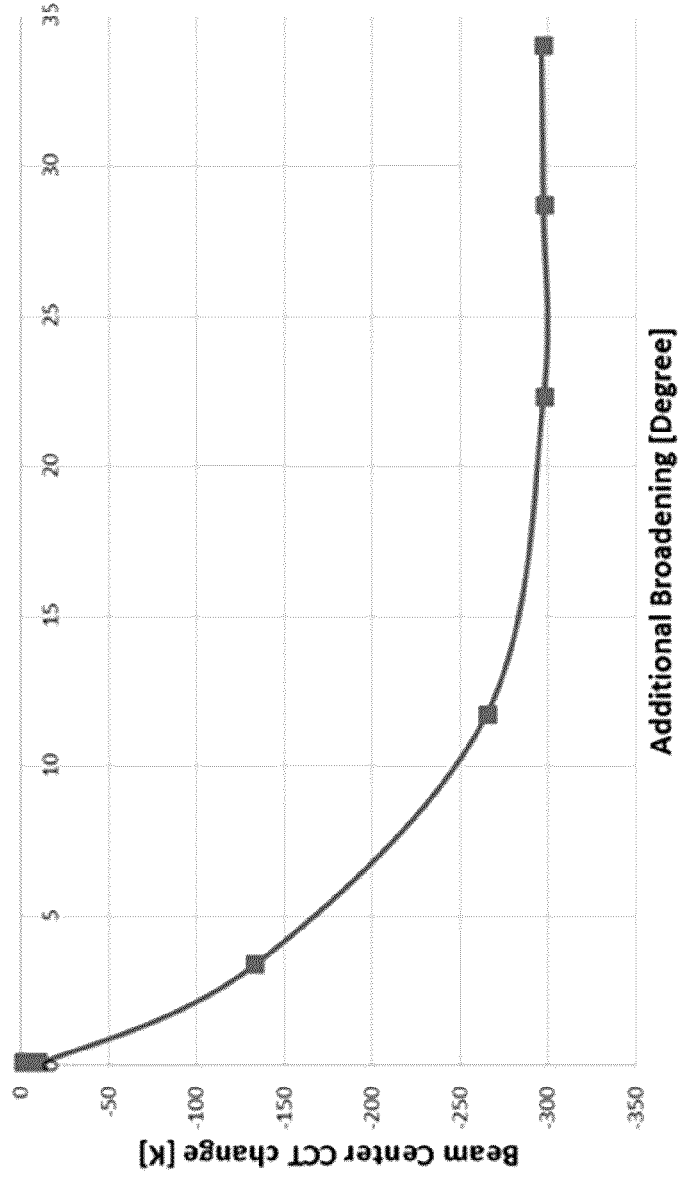
FIG. 3 is a diagram showing the change of the CCT in the center of the beam (low divergence angles) versus the additional broadening degree provided by the LC beam shaper.

Likewise, as illustrated in FIG. 1b, the light produced by a source with a blue LED-pumped phosphor that up-converts the wavelength of light by emitting a white light, can be collimated (by a base lens or reflector) into a relatively narrow beam (with low angular divergence), as shown in FIG. 2 (at 0V). The application of a moderate voltage (6V, 8V and 20 V) to the LC dynamic beam shaper can generate an angularly broadened beam, as illustrated in FIG. 2. In such devices, because of the above-mentioned chromatic aberration problem, the broadened light beam loses its CCT in the centre of the beam (the well collimated portion of the beam) compared to the periphery of the beam (more diverging portion). FIG. 3 illustrates the relative change of the CCT in the centre of the beam (measured at normal incidence of the original beam) versus the broadening of the divergence angle of the beam (measured as full width at half maximum or FWHM) generated by the LC beam shaping device.

Figure 4:
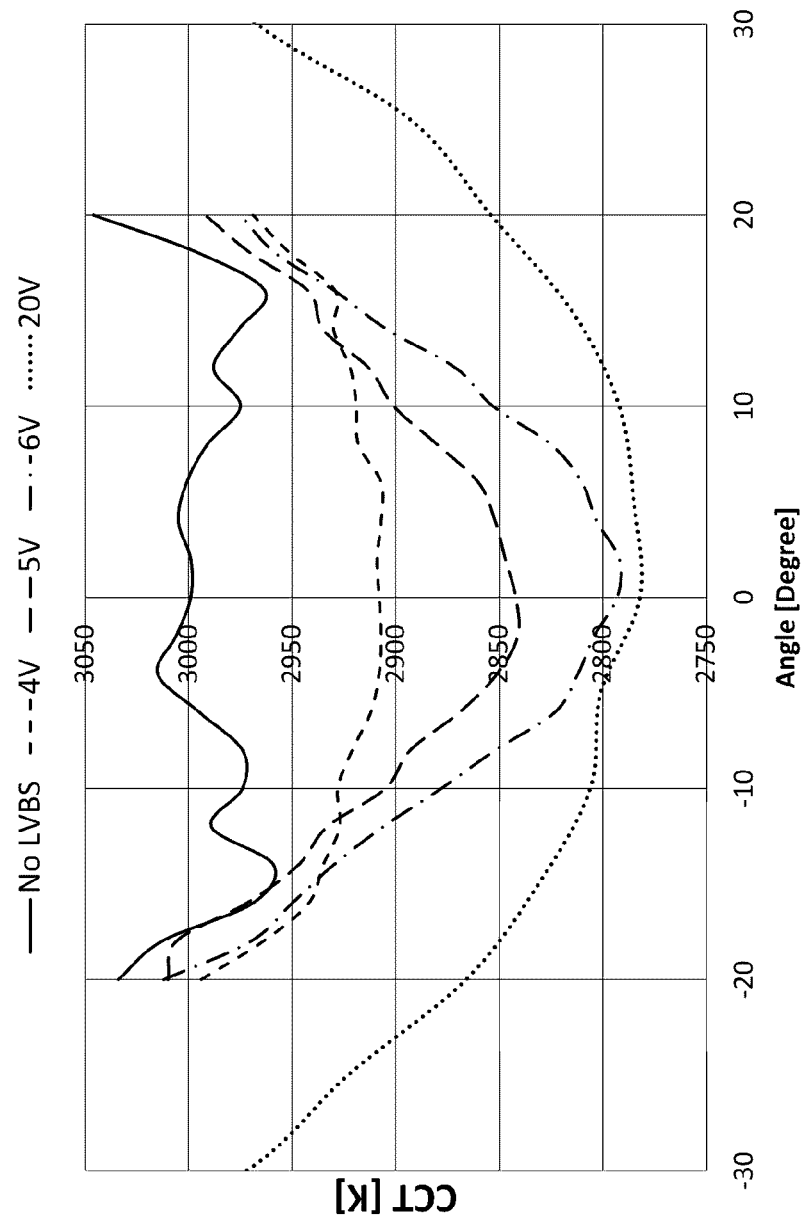
FIG. 4 is a diagram showing the CCT vs viewing angles for different levels of beam divergence angles (numbers on the top represent the voltages applied to the LC beam shaper to change the beam's intensity distribution over angle).

In fact, the entire angular distribution of the CCT is changed, as illustrated in FIG. 4, with the increase of voltage on the beam shaper (producing broadening of the beam with different full width at half maximum (FWHM) values; the CCT is decreased in the centre and increased in the periphery. However, the change of CCT in the centre is more important than in the periphery (because of human perception) and must be limited.

Figure 5:
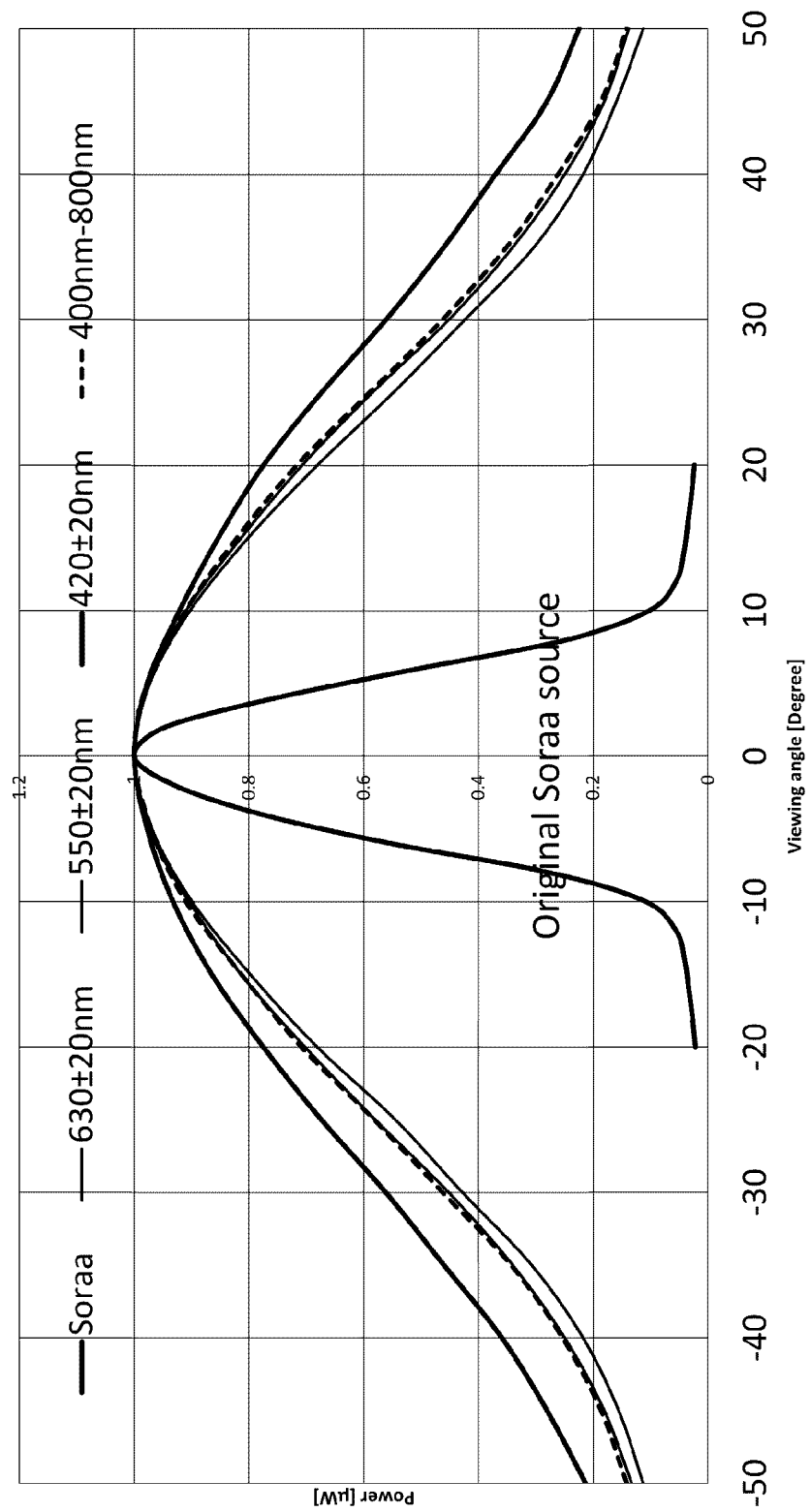
FIG. 5 is a diagram showing the wavelength dependence of light broadening by an LC beam shaper for different viewing angles.

The more careful angular study of the wavelength dependence of light broadening by an LC beam shaper is illustrated in FIG. 5 for the normal incidence of the original light beam from a commercial "Soraa" source. Where the original power distribution is narrow ("Soraa"), then the application of 20V on the LC beam shaper brings to the broadening of the beam, but different colors are broadened differently: short wavelengths (blue) are more broadened (or "redistributed") than long wavelength (red).

In addition, to the wavelength dependence of the CCT change, the inventor has found that the CCT change depends upon the angle of light incidence on the LC beam shaper. Moreover, the dynamically increased divergence of a spectrally broadband light (with different wavelengths), obtained by a LC beam control device (such as dynamic beam shaping device), can be greater for the original light beam that is collimated than for a similar broadband incident light beam that is originally more divergent.

Figure 6:
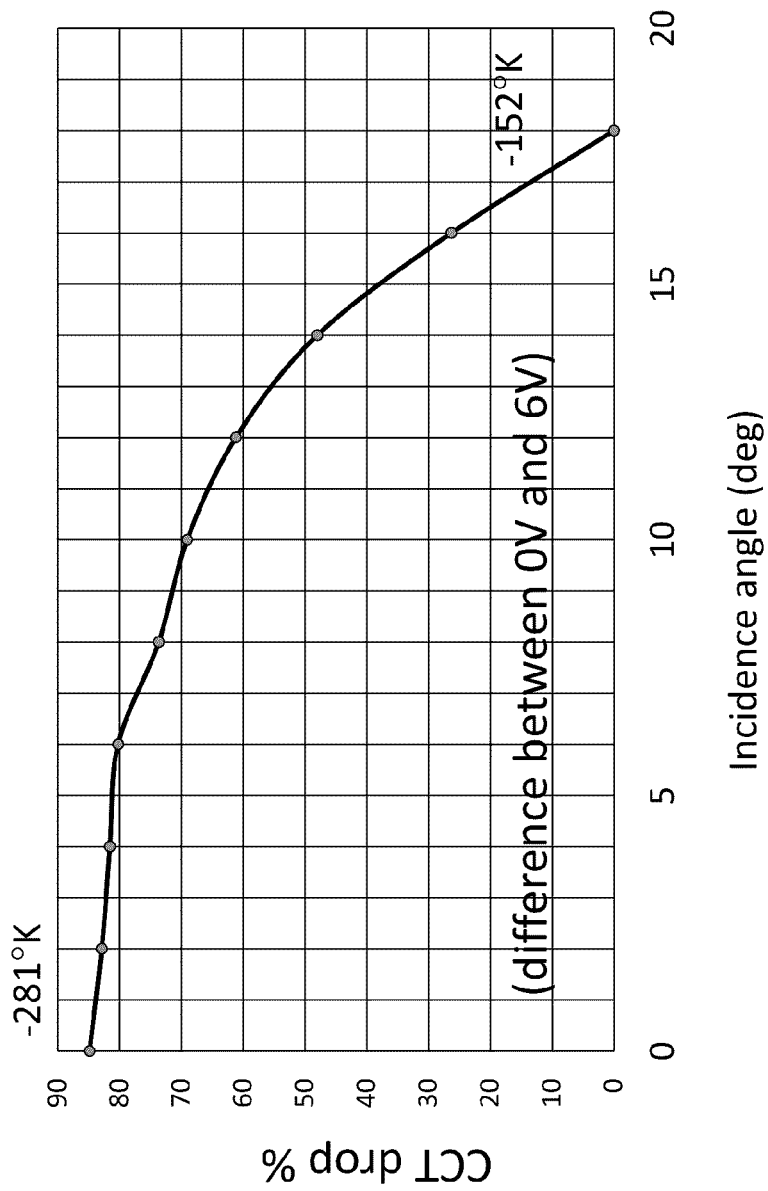
FIG. 6 is a diagram showing an example of the relative CCT drop percentage vs the incidence angle (in degrees). The difference is observed between two states of the LC beam shaper: passive and active, when, respectively, 0V and 6V are applied to it.

Referring to FIG. 6, it illustrates an example of how the relative CCT drop may be different for different incidence angles. As shown, the CCT drop is significantly higher for normally incident wave (−281 K) compared to the beam that is incident at larger angles (−152 K).

The difference is measured between the voltages 0V (no broadening, for an original beam with 5.7° F.WHM divergence, and with 3300° K average CCT, without the LC beam shaper) and 6V (moderately broadened beam) applied to the LC beam shaper.

The above mentioned problem is aggravated by the fact that many commercially available light sources either have higher CCT in the centre of the beam (bell shaped CCT distribution over angle), as shown in FIG. 7, (Soraa, at 0V), or have a relatively flat distribution (CREE, at 0V).

Figure 8B:
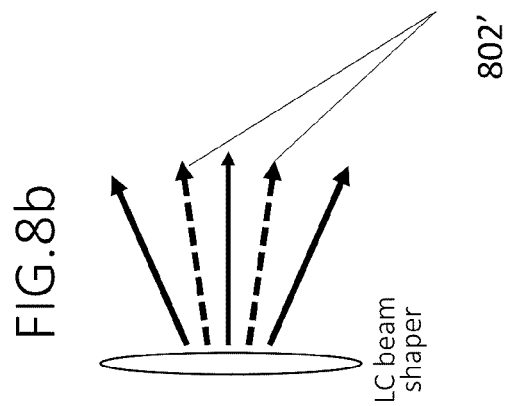
FIG. 8b is the same beam after passing the activated LC beam sharper.
Figure 8A:
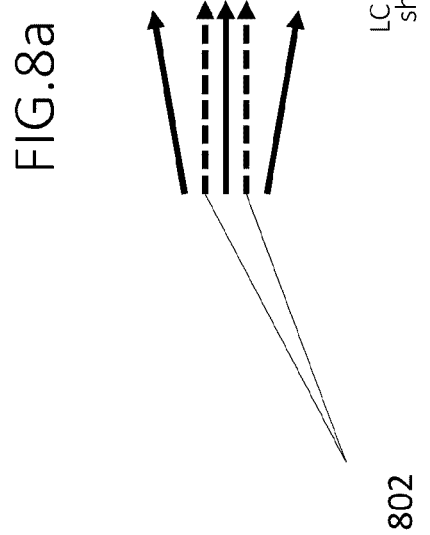
FIG. 8a is a schematic illustration of a beam with original (before the LC beam shaper) bell-shaped CCT distribution (such as, the Soraa source; blue photons, represented by dashed arrows, are more present at low incidence angles)

Therefore, the CCT change is important in the centre of the dynamically broadened beam, since originally more well-collimated blue photons exist (e.g., in the Soraa source), schematically shown FIG. 8a as dashed arrows, at normal incidence. Thus, the well collimated blue photons will be strongly redistributed from the centre to the periphery of the beam; or otherwise, from well collimated to less collimated state as illustrated in FIG. 8b. The redistribution of red photons (solid arrows) will be less important as illustrated in FIG. 5 and in FIG. 8b. This is what generates the CCT changes described in FIG. 3 and FIG. 4.

The experimental observations of the inventor, such as shown in FIG. 5 and FIG. 6, resulted in better understanding of the mechanisms and in the design of an original light beam, which will have less CCT change in the centre of the beam when it's broaden gradually by means of a dynamic beam shaping device.

The schematics of such a desired beam is described in FIG. 9a. In some embodiments, this may be characterized by two main features. First, having higher CCT in the periphery, which means, more red photons in the centre, or, otherwise said, red photons are more angularly collimated than blue photons. Second, the desired beam must have some relatively important blue energy on the periphery (see the plateau of power dependence versus angle), FIG. 9a and FIG. 9b.

Figure 9C:
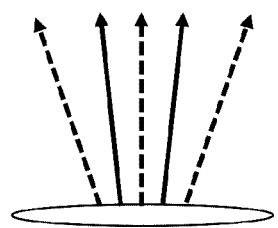
FIGS. 9b and 9c schematically demonstrate the effect of angular distribution of blue photons (represented by dashed arrows) in a beam, respectively before and after passing through the activated LC beam shaper.
Figure 9B:
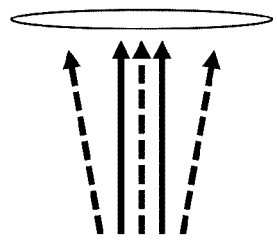

In some embodiments, as illustrated in FIG. 9c, the "redistribution" of the blue photons from the plateau will benefit also the central part, to maintain substantially the same CCT in the centre after the dynamic beam broadening is performed.

In some embodiments, to avoid the significant reduction (change) of the CCT in the centre of the beam, the present disclosure uses light sources (in combination of LC dynamic beam shapers), which have less photons with short (or blue) wavelengths in the central part of the beam (the well collimated part), which results in having more of them in the periphery of the beam (at slightly higher angles). In addition, the beam provides enough "blue" energy in the mid-to-large angular part of the beam to compensate their loss in the center after the dynamic broadening.

To achieve this, the present disclosure provides an original luminaire beam with more well collimated long wavelength (red) photons and we should also have less-well collimated short wavelengths (blue). When the dynamic beam is broadened, in the central part of the beam, the well-collimated red photons are less deviated then the well-collimated blue photons, but there were already fewer blue photons in the centre (which are well collimated) to start with. In addition, the less-efficient, but still existing, redistribution of blue light, originally propagating at slightly larger angles, benefits also to the centre of the beam (some blue photons are redistributed also into the centre of the beam). Therefore, the central CCT change in the center may be minimized.

Figure 10:
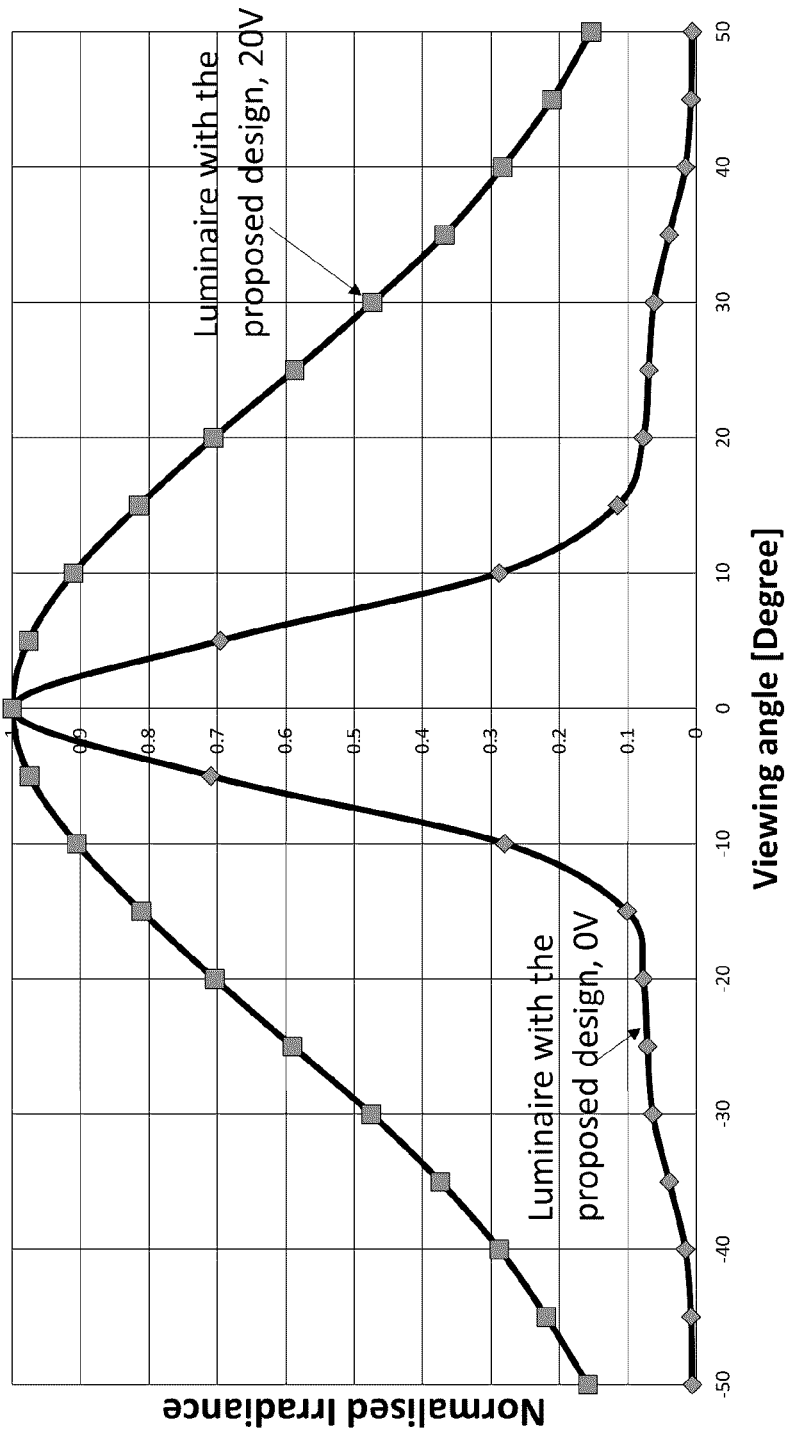
FIG. 10 is a diagram showing the total optical power distribution over angle for the desired luminaire for 0V and 20V, applied to the LC beam shaper.

For some embodiments, the experimental confirmation is made with a specially designed luminaire comprising LED, Phosphor and a Base lens (reflector), the same structure illustrated in FIG. 1b, with the characteristics according to the design shown in FIG. 9a. The original total power distribution of the proposed luminaire is shown in FIG. 10 (Luminaire with the proposed design for 0V being applied to the LC beam shaper). The dynamic broadening (see FIG. 10: (Luminaire with the proposed design for 20V being applied to the LC beam shaper) was performed in the proposed design and the difference of energy's angular distribution (between 0V/ground state and broadened/20V) can be seen for the normalized power distribution versus observation angle.

Figure 11:
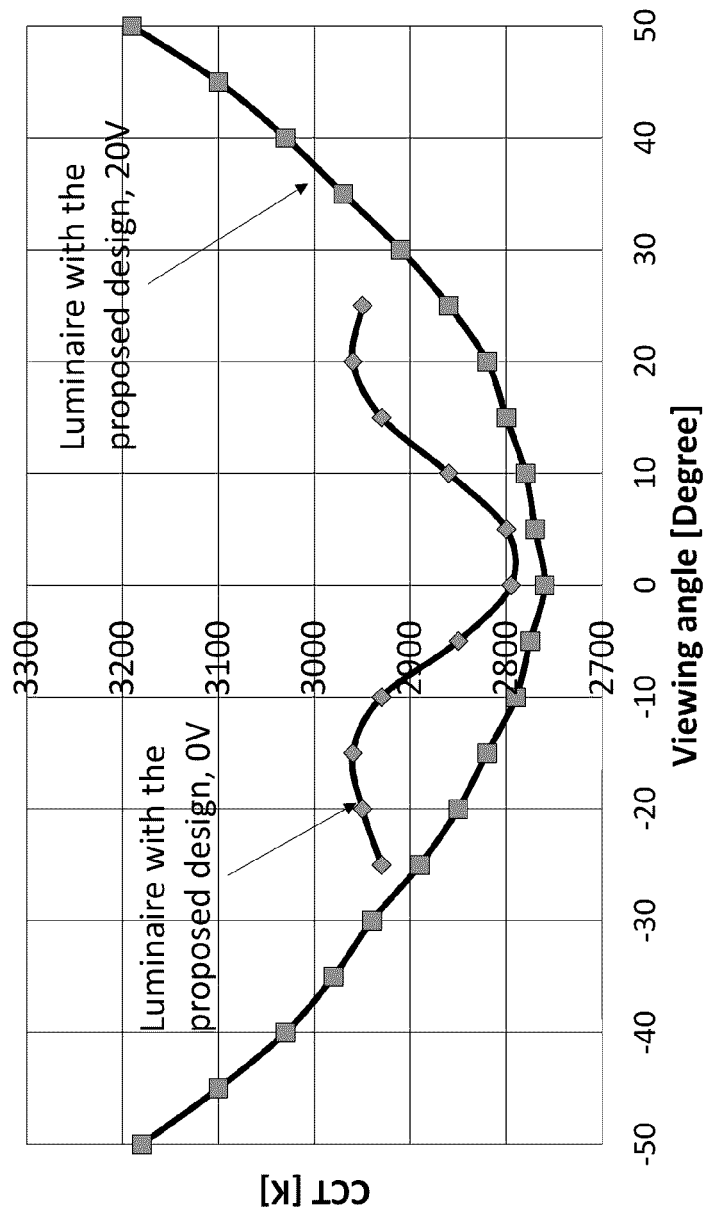
FIG. 11 shows the CCT distribution over angle for the luminaire having the desired design, before (at 0V) and after (20V) of angular broadening by using the LC beam shaper in accordance with one embodiment of the present disclosure.

Angular distributions of the CCT, before (0V) and after (20V) of dynamic broadening are illustrated in FIG. 11 for the proposed luminaire, described in FIG. 9 and FIG. 10. The dynamic broadening was performed by using the same LC beam shaper. The difference of CCT's angular distributions can be seen between 0V/ground state and broadened/20V. As it can be seen, the change of the CCT in the centre of the proposed design is very small (at the order of 50K only) compared to other cases (up to 300K, as illustrated in FIG. 3 and FIG. 4). The CCT profile, when no LC beam shaper is active, can be described as having an inverted bell shape.

In some alternative embodiments, the present disclosure provides an electrically tunable spectral filter, which may be added to the LC beam shaper. The spectral filter can be activated along with the dynamic broadening of the beam. One example of such spectral filter is the cholesteric liquid crystal that can have different optical modes such as reflection, scattering and transmission.

Figure 12A:
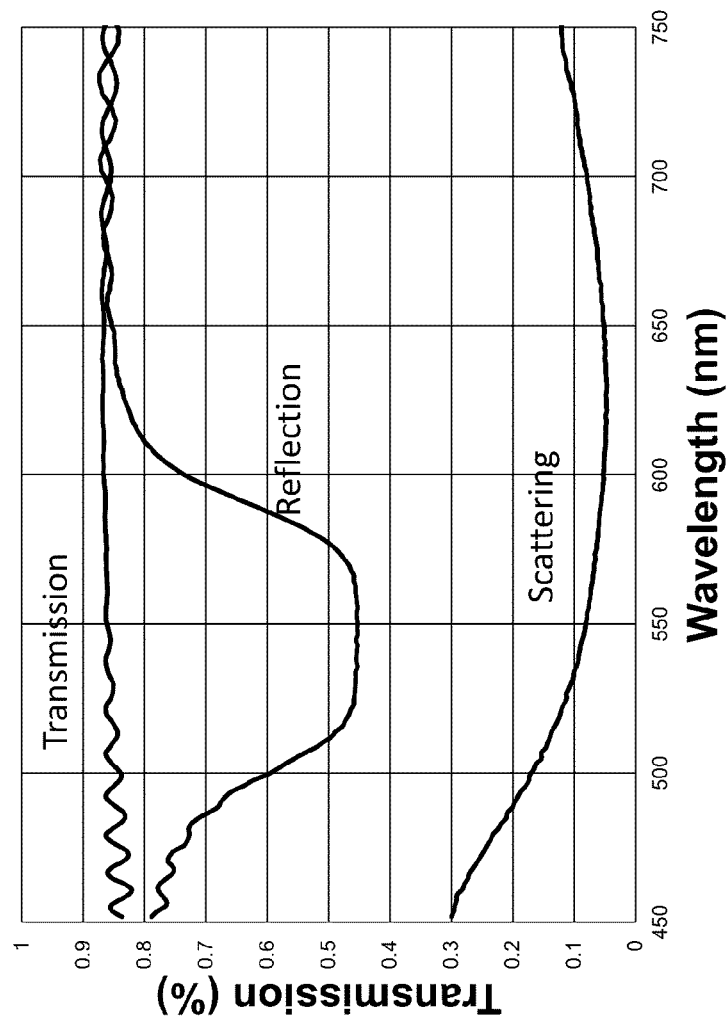
FIG. 12a is a diagram showing transmission, reflection and scattering of light with different wavelengths by using a cholesteric liquid crystal based electrically tunable spectral filter.
Figure 12B:
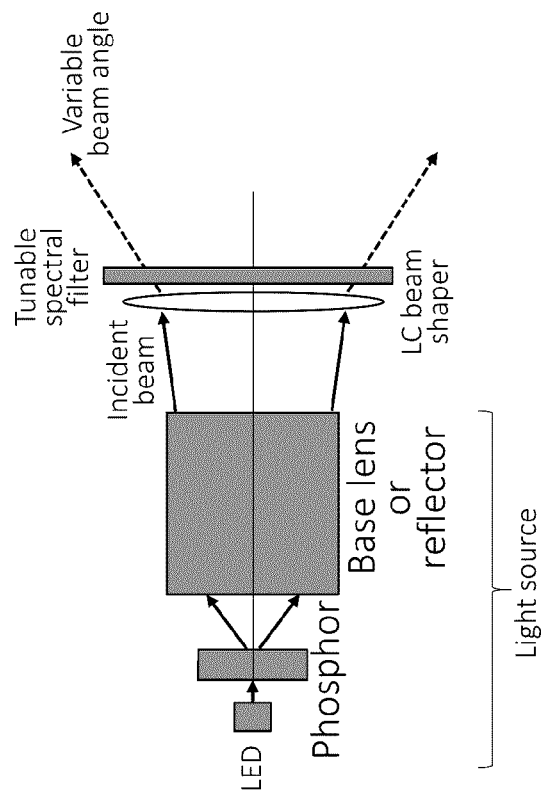
FIG. 12b is a schematic illustration of an embodiment of present disclosure having a tunable spectral filter along with the LC beam shaper.

Now referring to FIG. 12a, as illustrated, the reflection of light has a resonant character (in this example, around 545 nm) defined by the pitch of the cholesteric liquid crystal's helix. Thus, the careful adjustment of the pitch of the cholesteric LC may allow the reduction of the transmission of specific wavelengths (e.g., blue photons), when needed (e.g., at the beginning, in the ground state of the LC beam shaper), and the increase of it when the CCT in the centre of the beam is reduced due to the dynamic broadening of light. To perform such performance, a cell of a cholesteric LC may be used before or after of the LC beam shaper, as shown in FIG. 12b. In one embodiment, this can even be integrated into the structure of the LC beam shaper (with appropriate driving signal distribution on the cholesteric cell and on the LC beam shaper to coordinate their actions).

Figure 13:
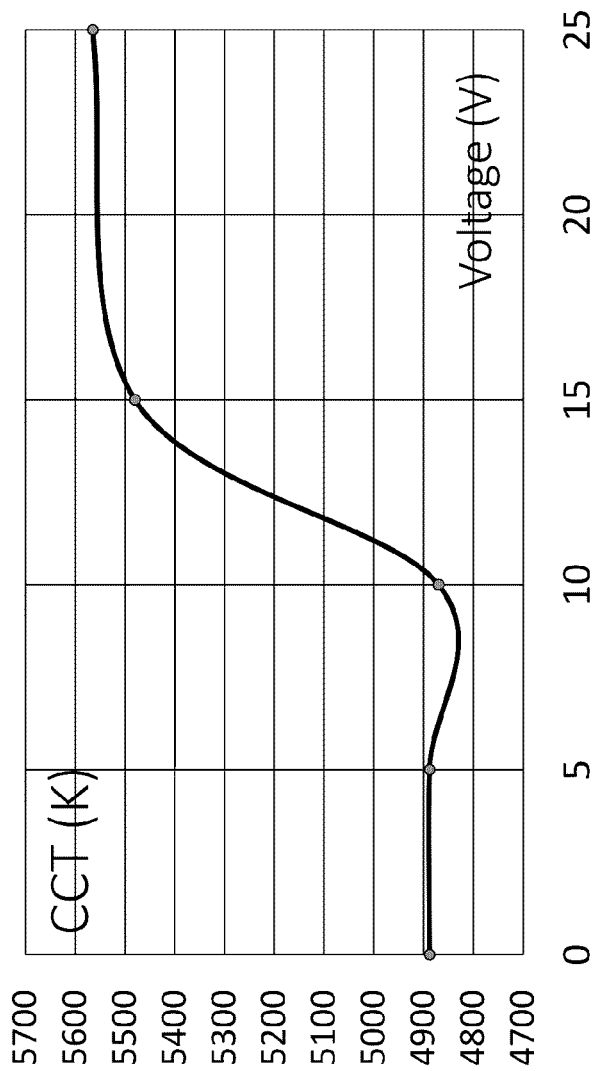
FIG. 13 is a diagram showing the CCT change of a broad band light (with different wavelengths) passing through the cholesteric liquid crystal film under different voltages applied (bringing the film from a state reflecting blue light into a state that is transmitting blue light).

An experiment was performed by using a planar oriented cell of a cholesteric liquid crystal (5 um thick, with adjusted pitch to have a resonance below 450 nm), wherein it was placed in front of a light source allowing the CCT of the beam, as illustrated in FIG. 13, to be continuously controlled. As shown, for low voltages, the rejection (reflection) of blue photons is important, defining a low CCT of transmitted light. As the voltage (applied on the cholesteric LC cell) was increased, the helical structure is transformed and, finally is completely unwound, a high transmission state is obtained that allows more blue photons to pass. This increases the CCT of transmitted light. This operation can be synchronized with the operation of the LC beam shaper. If the traditional light sources are not designed according to our first embodiment, then the gradual broadening of their beam (by the LC beam shaper) could be accompanied by the use of this electrically variable (or tunable) spectral filter to increase the overall quantity of blue photons. Since the CCT's value is most important in the centre of the beam, this would help to reduce the perception of the CCT change in the center.

Figure 14A:
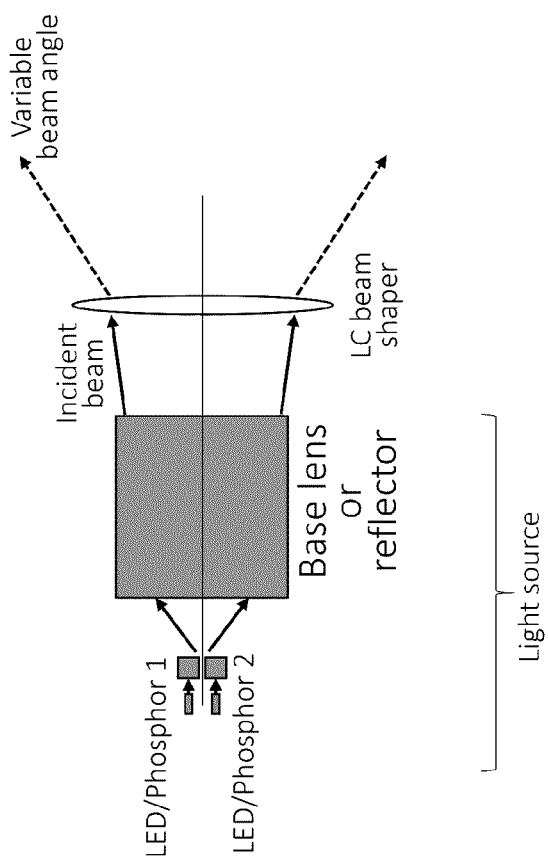
FIG. 14a is a schematic illustration of an embodiment of present disclosure having embedded color control mechanism for avoiding CCT loss with separate Phosphor elements.
Figure 14B:
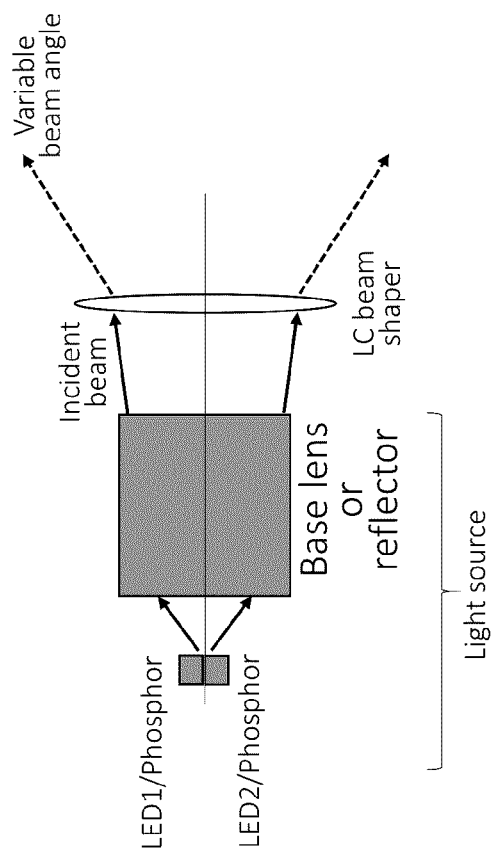
FIG. 14b is a schematic illustration of an embodiment of present disclosure having embedded color control mechanism for avoiding CCT loss with different LED elements.

In another, alternative embodiment, we can also use light sources with embedded color control (see FIG. 14) to avoid the loss of CCT in the centre of the beam. This may be done by using, e.g., a light source with different LED/phosphor sources assembled together (FIG. 14a) or by using LED/phosphor sources integrated directly (FIG. 14b) on the chip. Indeed, if we use more than one source, with different CCTs (e.g., same phosphor but different LEDs, or the same LED but different phosphors, or different LEDs and different phosphors), then we can electrically adjust the color of the emitted (incident) beam when we gradually change its divergence by means of an LC beam shaper.

As in the case of the tunable spectral filter, in this case also, we can provide an algorithm and corresponding electronic board (possibly also a CCT sensor, if we desire to work on the open-loop configuration) to control the color of the emitted beam when we gradually increase its divergence angle by an LC beam shaper. Various options of control can be used, as described in FIG. 15a to 15c.

Figure 15B:
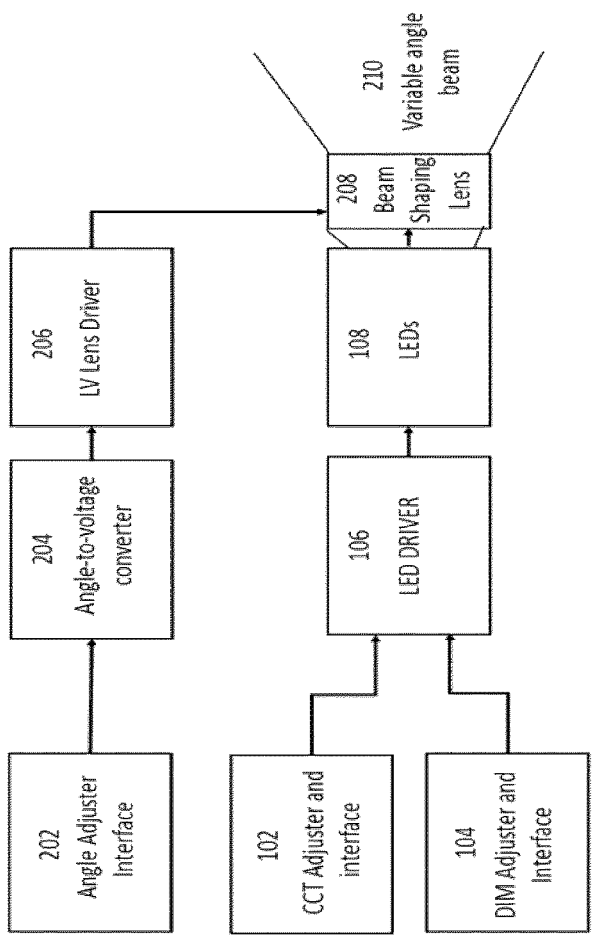
FIG. 15b shows a block diagram of an example of a variable angle beam fixture with CCT adjustment.
Figure 15A:
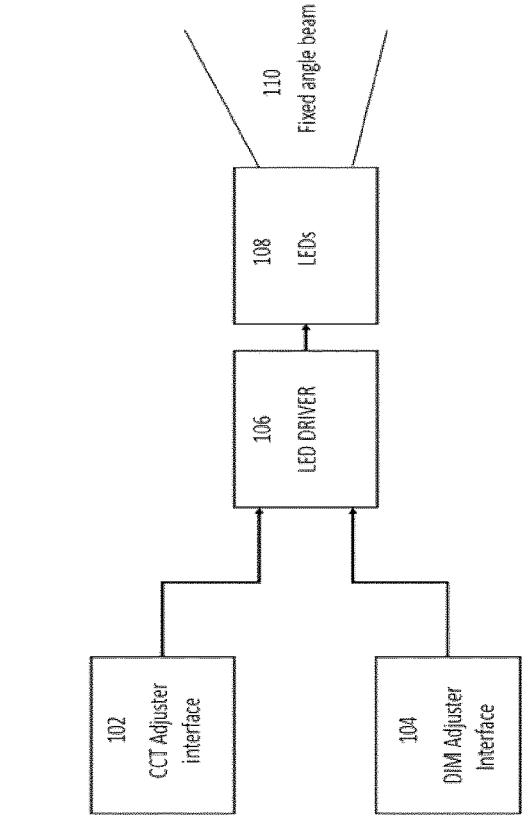
FIG. 15a shows a block diagram of an example of a fixed angle beam fixture with CCT adjustment.

FIG. 15a shows a state-of-the-art LED Fixture 100 that is capable of producing light with different color temperatures with a fixed angle beam 110. The temperature control is typically accomplished by mixing light from LEDs, or groups of LEDs 108, with (at least two) different colors. LED driver 106 receives dimming and CCT input from CCT adjuster and interface 102 and/or Dim adjuster and interface 104 which can work as controllers and directly produce commands to the LED driver 106 in order to provide the appropriate voltages/currents for driving each group of LEDs 108 to get the desired effect.

The dimming user-interface control elements can be physical sliders or knobs on a wall or slider controls of an app running on a smart lighting control device. The CCT adjuster and interface may be two separate different units or an integrated unit.

Unit 100 is capable of adjusting the LED's 108 light combination so that the output has the desired color temperature, this can be achieved by considering the fixed angle 110 and how it affects the quality the white color, or any other desirable color, beam.

Referring to FIG. 15b, a beam angle control mechanism can be added to the typical CCT fixture as shown in FIG. 15a to provide a variable angle beam. The detail of such a mechanism can be found in the PCT application with international publication number WO2017041167A1.

As illustrated in FIG. 15b, a fixture 200 has a beam shaping lens 208 which has an LV lens drive 206 which receives commands from an angle-to-voltage converter 204 which may be controlled by a user through angle adjuster interface 202. When the beam shaping lens 208 changes the angle of the light beam 210, the red, blue and green having different indices of refection break differently resulting in different intensity and concentration of each color within the borders of the white light beam and forming edges of different colors around the white light beam.

Figure 15C:
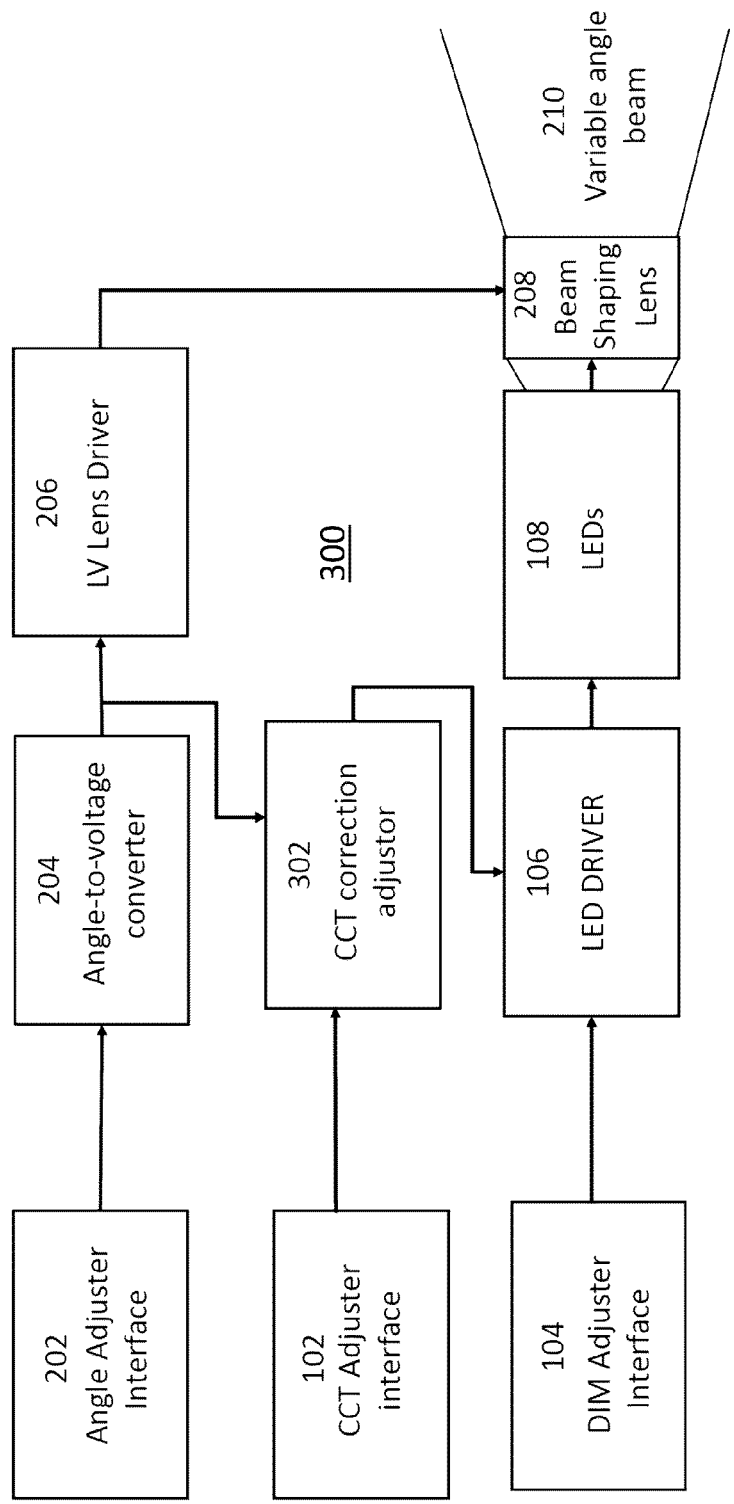
FIG. 15c shows a lighting apparatus in accordance with one embodiment of the present disclosure wherein a CCT correction adjuster receives feedback from a light sensor.

According to one aspect for the present disclosure, as illustrated in FIG. 15c, a fixture 300 is provided with a CCT correction adjuster 302 which provides the changes required by the LED driver 106 to mitigate the drop or change in the color temperature of the LED. This CCT correction adjuster 302 receives input from CCT adjuster interface 102 and from the angle-to-voltage converter 204 and will produce the CCT input for the LED driver 106 so that as the voltage applied to the lens 208 is increased, the incoming color temperature level is increased by the appropriate amount needed to compensate for the color-temperature drop, and to keep the beam color temperature constant. This block can be implemented as a two-dimensional array in the control app, or a combined LED/Lens driver.

In some embodiments, an experimentally provided table or diagram may be used to determine the co-relationship between the angle and the color temperature increase used by CCT correction adjuster 302.

We claim:

1. A controllable light beam device comprising:
   a light source having primary optics producing a low divergence light beam having an inverted angular distribution of the correlated color temperature (CCT); and
   a liquid crystal device with an electrically variable refractive index distribution arranged to receive said light beam and to provide a variable angle beam,
   wherein a CCT variation in said variable angle beam between said liquid crystal device providing substantially no beam broadening and providing additional beam broadening is less than a CCT of said light source.

2. The device as defined in claim 1, wherein a CCT variation in said variable angle beam at about 0 degrees of viewing angle between substantially no beam broadening by said liquid crystal device and providing about 15 additional degrees of beam broadening by said liquid crystal device is less than about 10% of a CCT of said light source.

3. The device as defined in claim 1, wherein a CCT variation in said variable angle beam in the range of about 0 degrees and about 10 degrees of viewing angle is less than about 10%, of a CCT of said light source both under conditions of substantially no beam broadening by said liquid crystal device and under conditions of about additional 15 additional degrees of beam broadening by said liquid crystal device.

4. The device as defined in claim 1, wherein said light source comprises a blue LED and a phosphor for producing white light in which shorter wavelengths of light have a greater divergence than longer wavelengths of light in said low divergence light beam.

5. A controllable light beam device comprising:
   a light source having primary optics producing a low divergence light beam having an inverted angular distribution of CCT; and
   a liquid crystal device with an electrically variable refractive index distribution arranged to receive said light beam and to provide a variable angle beam,
   wherein said low divergence light beam has a lower CCT at a viewing angle of 0 degrees than a CCT at a viewing angle in the range of 10 to 15 degrees.

6. The device as defined in claim 5, wherein said low divergence light beam has an inverted bell shape CCT profile as a function of viewing angle.

7. A controllable light beam device comprising:
   a light source having primary optics producing a low divergence light beam;
   a liquid crystal device with an electrically variable refractive index distribution arranged to receive said light beam and to provide a variable angle beam; and
   a tunable color filter arranged to receive said light beam,
   wherein a CCT variation in said variable angle beam in the range of about 0 degrees and about 10 degrees of viewing angle between substantially no beam broadening by said liquid crystal device and providing about 15 additional degrees of beam broadening by said liquid crystal device is less than about 10% of a CCT of said light beam at about 0 degrees of viewing angle by using said tunable color filter to adjust a CCT of said variable angle beam.

8. The device as defined in claim 7,
   wherein the CCT variation in said variable angle beam in the range of 0 degrees and 10 degrees of viewing angle between no beam broadening by said liquid crystal device and providing about 15 additional degrees of beam broadening by said liquid crystal device is of the CCT of said light beam at 0 degrees of viewing angle by using said tunable color filter to adjust the CCT of said variable angle beam.

9. The device as defined in claim 7, further comprising a controller responsive to a beam broadening input signal for outputting a first control signal to said liquid crystal device and a second control signal to said tunable color filter.

10. The device as defined in claim 7, wherein said tunable color filter is a cholesteric liquid crystal filter.

11. The device as defined in claim 10, wherein said cholesteric liquid crystal contains a polymer that stabilizes the position of its resonance.

12. A lighting apparatus with a variable angle beam, the apparatus comprising:
   a light source having an adjustable color temperature;
   a light module driver configured to adjust currents applied to said light source to adjust said color temperature accordingly;
   a liquid crystal beam shaping device with variable refractive indices for different colors having a lens driver configured to receive a fixed angle beam from said light source and to provide a variable angle beam in response to a control signal;
   an angle adjustor interface for receiving an input beam angle and providing said control signal;
   a CCT correction unit receiving one of said input beam angle and said control signal and controlling said light module driver to adjust a color temperature as a function of said variable angle to control a color-temperature variation in said variable angle beam caused by said beam shaping device.

13. A beam control device for use with a lighting apparatus having:
   a light source having an adjustable color temperature;
   a light module driver configured to adjust currents applied to said light source to adjust said color temperature accordingly;
   the beam control device comprising:
   a liquid crystal beam shaping device with variable refractive indices for different colors having a lens driver configured to receive a fixed angle beam from said light source and to provide a variable angle beam in response to a control signal;
   an angle adjustor interface for receiving an input beam angle and providing said control signal;
   a CCT correction unit receiving one of said input beam angle and said control signal and outputting said currents applied to said light source to adjust a color temperature as a function of said variable angle to control a color-temperature variation in said variable angle beam caused by said beam shaping device.

14. The device as defined in claim 1, wherein said low divergence light beam has an inverted bell shape CCT profile as a function of viewing angle.

15. The device as defined in claim 2, wherein a CCT variation in said variable angle beam at about 0 degrees of viewing angle between substantially no beam broadening by said liquid crystal device and providing about 15 additional degrees of beam broadening by said liquid crystal device is less than about 7% of a CCT of said light source.

16. The device as defined in claim 3, wherein a CCT variation in said variable angle beam in the range of about 0 degrees and about 10 degrees of viewing angle is less than about 7% of a CCT of said light source both under conditions of substantially no beam broadening by said liquid crystal device and under conditions of about 15 additional degrees of beam broadening by said liquid crystal device.

17. The device as defined in claim 5, wherein a CCT variation in said variable angle beam in the range of about 0 degrees and about 10 degrees of viewing angle is less than about 10% of a CCT of said light source both under conditions of substantially no beam broadening by said liquid crystal device and under conditions of about 15 additional degrees of beam broadening by said liquid crystal device.

18. The device as defined in claim 7, wherein said low divergence light beam has a lower CCT at a viewing angle of about 0 degrees than a CCT at a viewing angle in the range of about 10 to about 15 degrees.

19. The apparatus as defined in claim 12, wherein said fixed angle beam has an inverted bell shape CCT profile as a function of viewing angle.

20. The device as defined in claim 13, wherein said fixed angle beam has an inverted bell shape CCT profile as a function of viewing angle.

* * * * *